(12) United States Patent
Prull

(10) Patent No.: US 10,512,257 B2
(45) Date of Patent: Dec. 24, 2019

(54) OPEN FLAME CONTROL SYSTEM FOR WEED CONTROL

(71) Applicant: Gregory G. Prull, Eugene, OR (US)

(72) Inventor: Gregory G. Prull, Eugene, OR (US)

(*) Notice: Subject to any disclaimer, the term of this patent is extended or adjusted under 35 U.S.C. 154(b) by 1319 days.

(21) Appl. No.: 13/897,083

(22) Filed: May 17, 2013

(65) Prior Publication Data

US 2013/0309620 A1 Nov. 21, 2013

Related U.S. Application Data

(60) Provisional application No. 61/688,656, filed on May 18, 2012.

(51) Int. Cl.
*F23C 7/00* (2006.01)
*A01M 21/04* (2006.01)
*F23D 14/58* (2006.01)

(52) U.S. Cl.
CPC ............ *A01M 21/04* (2013.01); *F23D 14/58* (2013.01)

(58) Field of Classification Search
CPC ....... A01M 15/00; A01M 3/007; F23D 14/52; F23D 2900/14125; F23D 14/58; F41H 9/02
USPC .......... 126/271; 47/1.44; 431/353, 350, 345, 431/298–329
See application file for complete search history.

(56) References Cited

U.S. PATENT DOCUMENTS

| 3,367,318 A * | 2/1968 | Murakami et al. ............. 126/96 |
| 4,657,506 A * | 4/1987 | Ihlenfield et al. ............ 431/329 |
| 2005/0143259 A1* | 6/2005 | Newson ..................... 504/116.1 |

* cited by examiner

*Primary Examiner* — Vivek K Shirsat
(74) *Attorney, Agent, or Firm* — Robert E. Howard

(57) ABSTRACT

An open flame control device for weed control. The device includes a substantially cylindrical basket having an open framework including a plurality of substantially equally spaced-apart longitudinal struts attached to a plurality of hoops, struts being inwardly and upwardly bent at the upper end of the basket. A hub is located at the upper end of the basket and is attached to the inwardly and upwardly bent struts. An open flame burner is located within the basket and attached to the hub. A porous metal fabric liner surrounds the inside of the basket and is attached thereto. A metal flame reflector is located at the lower end of the basket and occupies the back side portion of the basket. Means are provided for communicating the open flame burner with a supply of propane. Optionally, means are provided to supply water to the bottom of the basket.

14 Claims, 3 Drawing Sheets

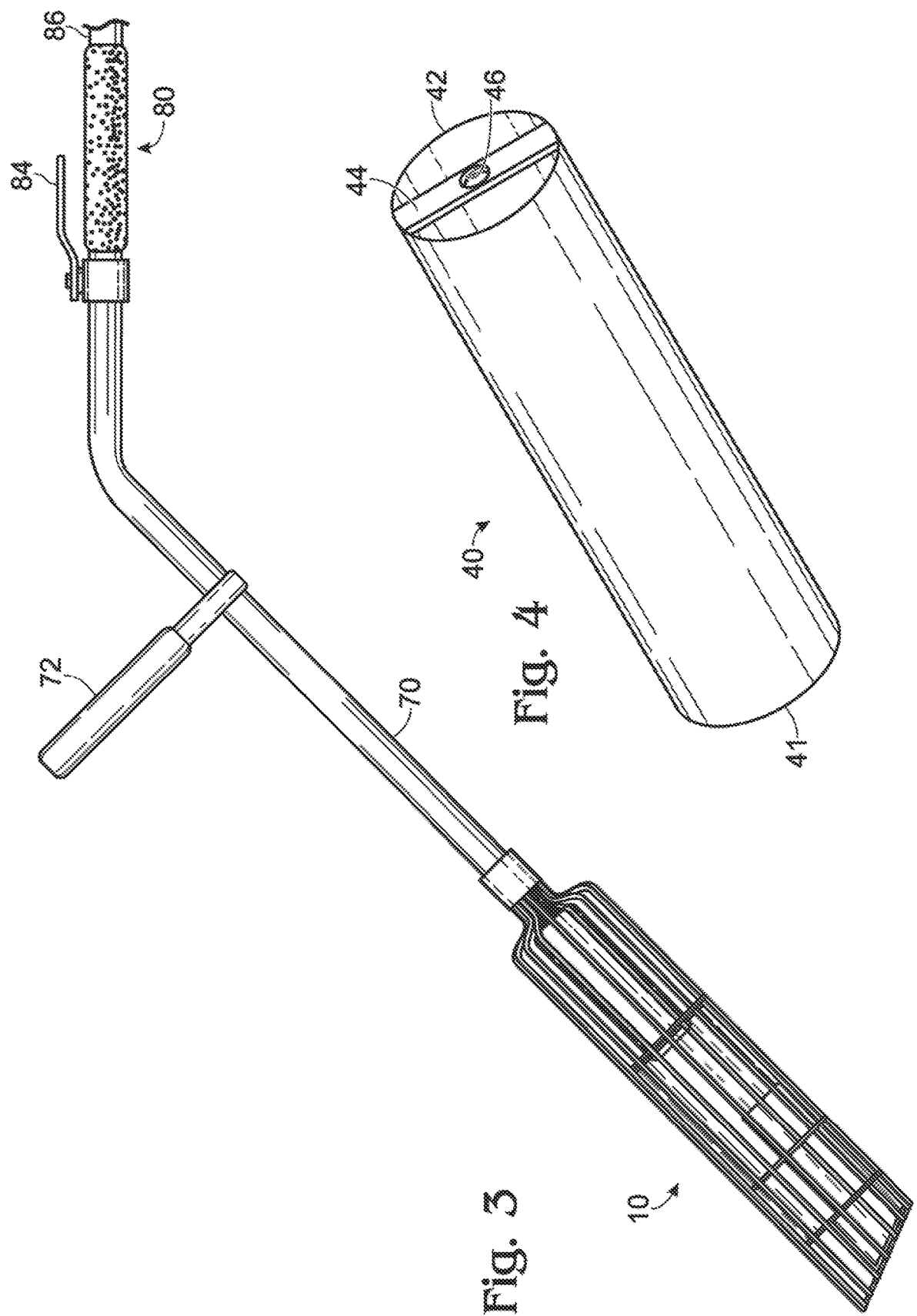

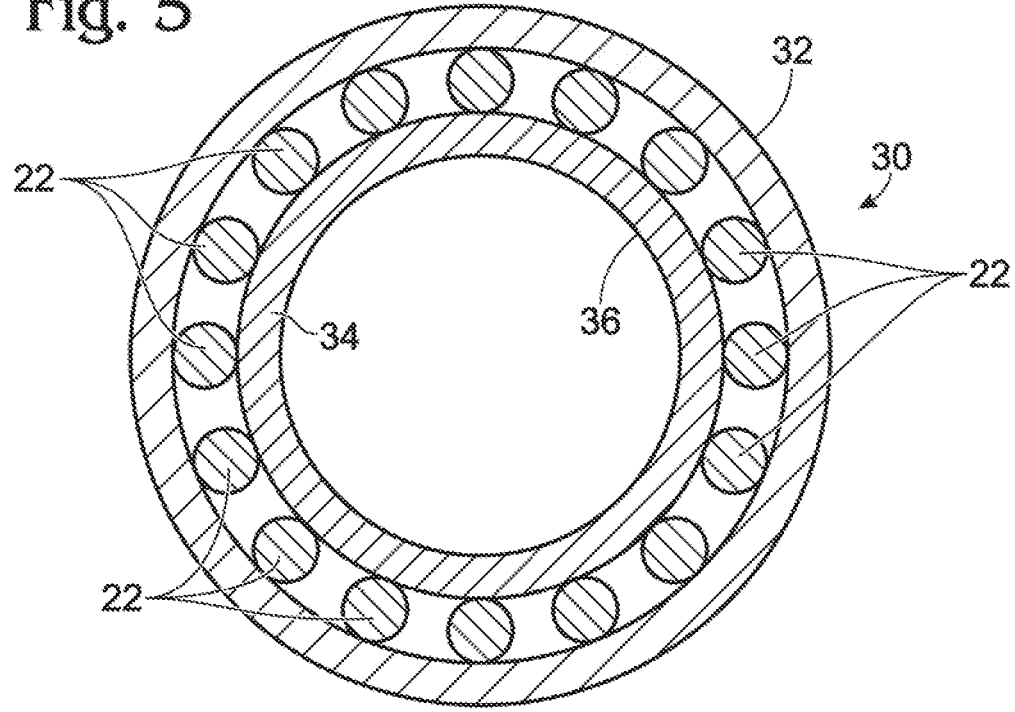
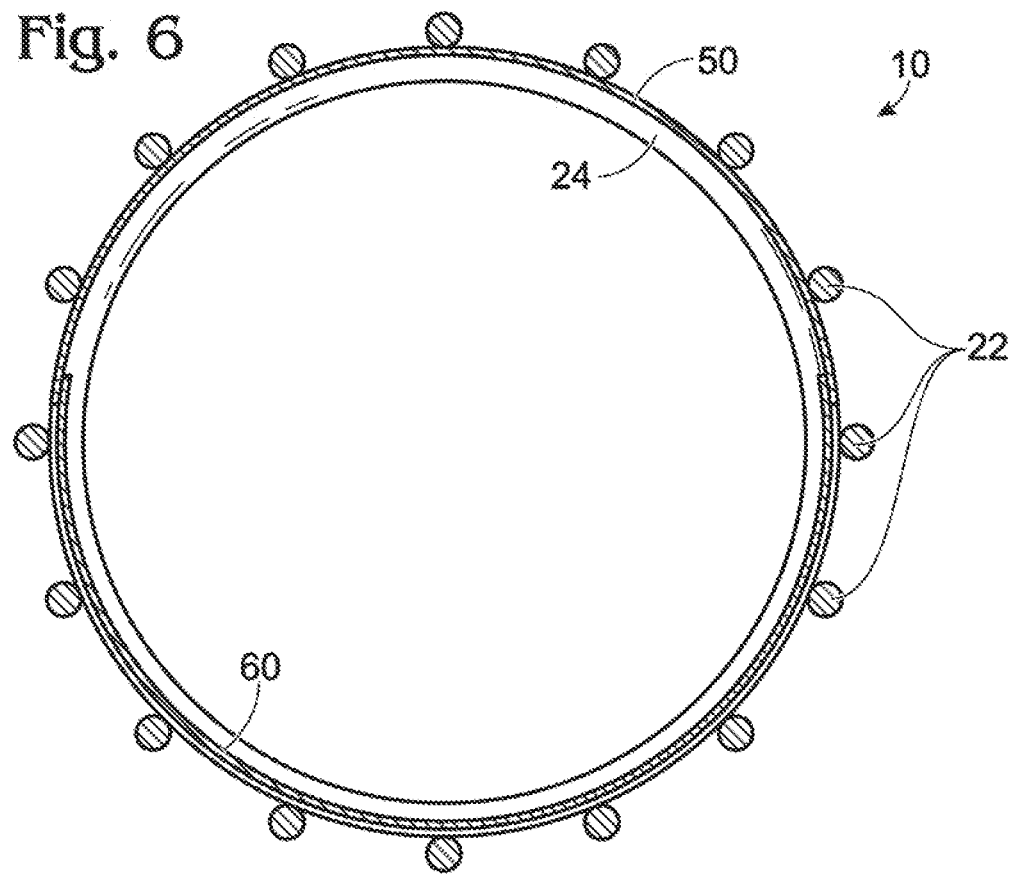

OPEN FLAME CONTROL SYSTEM FOR WEED CONTROL

CROSS REFERENCE TO RELATED APPLICATIONS

This application claims the benefit of Provisional Patent Application Ser. No. 61/688,656 filed May 18, 2012, the entire contents of which are hereby incorporated by reference.

BACKGROUND OF THE INVENTION

The present invention relates to an open flame control system for weed control primarily by use of hand held devices, but also, for some applications, of larger, mechanized equipment.

The use of herbicides and other chemicals to control weeds has generated much environmental concern.

One alternative to the use of herbicides and other chemicals to control weeds is the use of open flame burners and torches. However, open flame burners and torches currently used for weed control are inefficient and hazardous. They are fuel intensive and unwanted smoke, out-of-control fires, as well as damage to desirable plants including horticultural plantings and agricultural crops, are a routine occurrence.

SUMMARY OF THE INVENTION

It is an object of the present invention to provide a more economical, flexible, adaptive, and light weight open flame control system for torches and burners used for weed control.

The benefits provided by the device of the present invention are derived from its unique open flame control system.

The components of the system serve one or more important functions with regard to managing the most critical factors influencing the flame and thermal characteristics of open flame burners and torches, the hot gases they create, and the results they produce: flame shape and size, containment, efficiency (including fuel consumption as well as the level of treatment impact), direction of flow, and the hazard of unwanted fire.

The components are engineered both individually and in relationship to each other so they will perform successfully in a coordinated manner and provide cost-effective results for specific uses or applications. This open flame control system is also "scalable", enabling the development of tools appropriate for application to small or large weed control operations.

The open flame control device of the present invention involves a containment structure that surrounds one or more open flame burners or torches. This structure is provided in two basic forms depending upon the intended uses or requirements of the application of the open flame burner(s) or torch(es).

The simplest form of the surrounding structure involves a tubular structure having at least partially solid or at least partially porous walls that contain and direct the flame(s) and the flow of hot gases toward the ground, preventing or limiting their full expansion and impact until they exit the containing tube. The cross-section of the tubular structure may be circular, oval, square, rectangular, etc. Preferably the tubular structure is substantially cylindrical. This form of the device helps prevent off target impacts and improves fuel efficiency while also providing the user with the ability to allow the flame and hot gases to expand in all directions a they exit the tube, thereby maximizing the "footprint" or impact area and making it easy to apply the tool effectively.

This control system is useful when there is a relatively large area with weeds to be treated and it allows the device to be held above the ground surface so the applicator can cover more ground with less effort than with the more complex design of the control system which requires maintenance of close proximity to the surface of the ground. The structure surrounding the burner(s) or torch(es) may be shaped (e.g., round, oval, etc.) to help influence the ground impact for a specific need or purpose. The length of the structure is coordinated with the size of the burner(s) or torch(es) and the length of the flame they produce and will be less than the focal length of the flame to allow the device to be held above the ground while providing maximum impact. One or more struts are used to hold the structure n the proper location relative to the position of the burner(s) or torch(es) and to provide a means to connect the surrounding structure to the burner(s) or torch(es) and to the fuel inlet supplying them. Additional struts or supporting elements may be utilized when the walls of the "tube" are constructed from thin solid material(s) or those made of mesh material(s).

The second and more complex form of the device has a superstructure with an open framework or basket which allows the combined use of other components that provide the user with greater control of the flame and hot gases exiting from the burner(s) or torch(es), a level of control which is not available from the more simple device.

The open framework design uses a plurality of longitudinal struts attached to a plurality of hoops, the struts being inwardly and upwardly bent at the upper end of the basket.

A coupler is located at the upper end of the basket and is attached to the inwardly and upwardly bent struts to form a hub.

One or more open flame burners or torches are located within the basket and attached to the coupler.

One or more porous metal fabric liners surround all or portions of the inside surface of the basket and are attached to the superstructure.

One or more sheet metal flame reflectors also line one or more portions of the basket's inside surface are attached to the superstructure.

Means are provided for communicating the open flame burner(s) or torch(es) with a supply of fuel.

Optionally, means are provided to supply water around the outside of the bottom of the basket.

BRIEF DESCRIPTION OF THE DRAWINGS

FIG. 3 is a side view of the device with a handle and control grip attached thereto;

FIG. 4 is a perspective view of a burner/torch element of the device;

FIG. 5 is a cross-sectional view of a typical hub of the device taken along line 5-5 of FIG. 1; and FIG. 6 is a cross-sectional view of a typical basket of the device taken along line 6-6 of FIG. 1.

DESCRIPTION OF PREFERRED EMBODIMENTS

Figure 1:
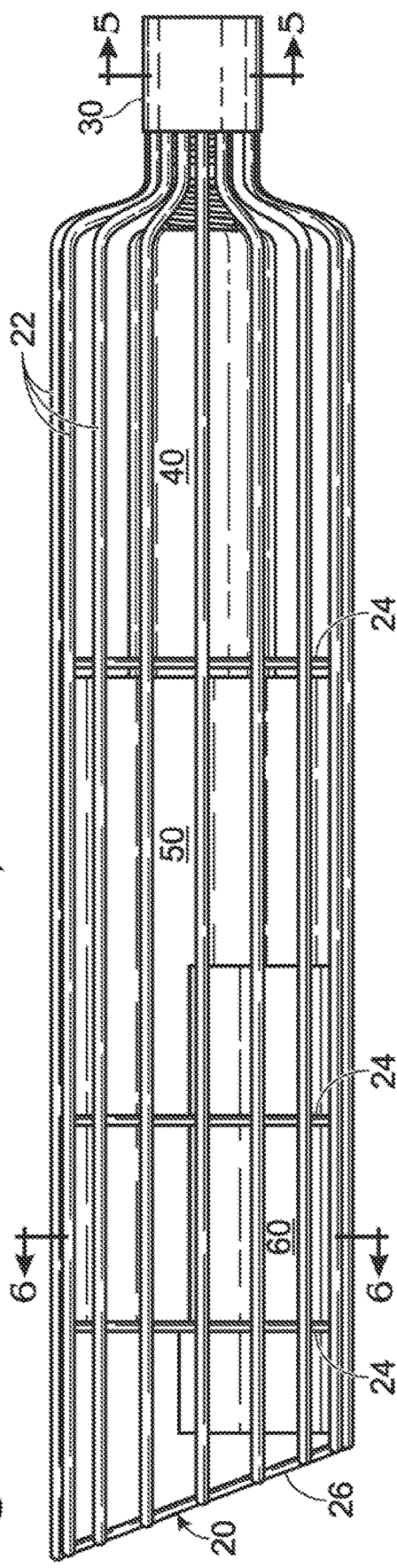
FIG. 1 is a side view of an exemplary flame control device based on the principles of the present invention.
Figure 2:
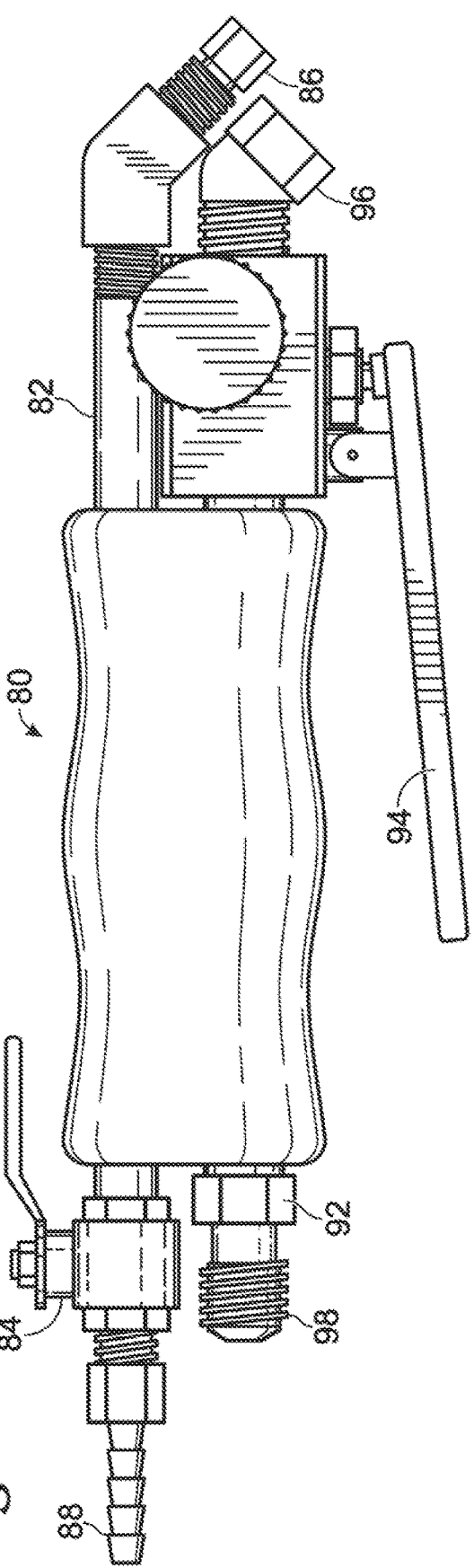
FIG. 2 is a side view of a control grip that can be used with the device.

The flame control device 10 is comprised of an open superstructure or basket 20 having a framework including a plurality of longitudinal struts 22. Struts 22 are held in place by attachment to a plurality of intermediate hoops 24 and a bottom hoop 26. Struts 22 vary in length to provide an angled bottom portion wherein the plane of bottom hoop 26 is at an angle to the longitudinal axis of device 10, as shown. The back side portion of device 10 is shown at the bottom of FIGS. 1 and 6 (the side with the shorter struts 22) and the front side portion of device 10 is that portion shown at the top of FIGS. 1 and 6 (the side with the longer struts 22).

A hub 30 is located at the upper end of typical device 10 and has an outer body 32 and an inner body 34. The upper ends of struts 22 are bent inwardly and upwardly for insertion into and attachment to the space between outer body 32 and inner body 34 of hub 30, as can be seen in FIG. 5. The inner wall 36 of inner body 34 is threaded for connecting to a fuel supply line.

An open flame torch or burner (e.g., propane) 40 has a lower end 41 and an upper end 42. Burner 40 is attached at its upper end 42 to the externally threaded lower end of hub 30 by a threaded opening 46 therein. Burner 40 extends downwardly into basket 20 so the bottom opening of the burner is positioned below the top rim of the inner metal fabric liner 50, thus ensuring the flame produced by the burner originates within the confines of the liner.

The porous metal fabric liner 50 is used to contain and direct the thermal energy and exhaust of the burner(s) or torch(es) and surrounds portions the inside of basket 20 and is attached thereto. The liner 50 extends between areas adjacent the bottom 41 of burner(s) or torch(es) 40 to an area adjacent the bottom of basket 20.

For example, in FIG. 1, a device designed for weed control along fence lines, liner 50 extends around the entire inner surface of basket 20 from just above the bottom opening of the burner 40 to the bottom of basket 20. However, liner 50 does not extend to the bottom of basket 20 in the lower front, thereby creating an opening for the flames, heat and exhaust gases to exit in a directed, controlled manner toward the front and partially to each side.

One or more metal flame reflector(s) 60 are also located on the inside surface of the superstructure 20 and attached to the superstructure. These reflectors are strategically located to contain, direct, and shape the flame(s), heat, and exhaust gases from the torch(es) or burner(s) to achieve the thermal impact for which a particular basket 20 is designed and constructed.

As best seen in FIG. 6, metal reflector 60 covers approximately ½ of the inside surface of the basket 20 adjacent the bottom, thereby preventing flames, heat and exhaust gases from exiting behind the basket 20 and only to a portion of each side. The carefully coordinated design of basket 20 and liners 50, 60 enables a user to limit the impact area of the device to a narrow and very neat "bandwidth" along the bottom of a fence line.

Device 10 is attached to a handle 70 having a control grip 80 located at its outer end. A handle bar 72 and angled fittings on the fuel supply tube aid in handling movement of device 10. Alternatively, instead of a handle for manual uses, basket(s) 20 may be mounted to a "tool bar" or other carrying system for mechanical applications. Such mounts may be adjustable to facilitate positioning of basket(s) 20 for optimum impact per cropping system.

For manually operated devices, control grip 80 includes a fuel line portion 82 having a valve 84. The outer end 86 of fuel line portion 82 is attached to a fuel supply (not shown) and the inner end 88 is attached to a conduit (not shown) which is attached to hub 30 and burner(s) or torch(es) 40. Control grip 80 can, optionally, include a water line portion 92 having a valve 94. The outer end 96 of water line 92 is attached to a water supply (not shown) and the inner end 98 is attached to a conduit or conduits for supplying water to nozzles (not shown) attached to device 10.

Hub 30 serves several functions. It serves as a connection between the fuel service line conduit and burner(s) or torch(es) 40. It serves as an attachment means for burner 40 to basket 20. It serves to facilitate and maintain the proper positional relationship between burner(s) or torch(es) 40 and basket 20. It can also be use to mount basket(s) to a tool bar or other carry system for mechanical applications.

Basket 20 serves several functions. It creates a defined space for capturing, containing, shaping, focusing, and directing the expanding flame and hot gases produced by burner(s) or torch(es) 40. It ensures an unobstructed flow of air to burner 40 to optimize primary and secondary combustion. It provides structural support for attaching one or more metal fabric liners 50 that are used to capture, contain, shape, and direct the expanding flame and hot gases produced by burner 40. It provides structural support for attaching and shaping one or more sheet metal flame reflectors 60 that are used to contain and direct the expanding flame(s) and hot gases produced by burner(s) or torch(es) 40. It is constructed to maximize treatment impact by making it easy for the user to focus the hottest point of the flame(s) on the target. It is angled at the bottom within a specific and narrow range to achieve two critical flame and exhaust control functions: (1) to direct the expanding flame and hot gases out the front of basket 20 and across the ground in a forward direction and to a limited extent to the sides; and (2) to prevent a "back flash" of flame and hot exhaust out of the top of basket 20. (A "back flash" is caused when the flame and exhaust from the burner(s) bounce off the ground and reverse direction—going straight up the basket 20 and out of the top rather than exiting out the bottom of the basket 20.) The basket 20 can be optimally shaped (round, oval, square, rectangular, triangular, etc.) for a specific function. The size of basket 20 can range in size from "micro" (e.g., for row crops grown closely together) to very large (e.g., for vineyards) depending upon application requirements or constraints. The length of a basket 20 is carefully coordinated with the length of the flame(s) from the burner(s) or torch(es) 40 to focus or maximize the impact of the flames and heat on target weeds. Basket 20 may also be extended in length and curved or shaped to serve specific applications (e.g, vineyards). Basket 20 may be hand held or attached to a frame or other device so it can be carried by a mobile "platform" (e.g., on a "tool bar" carried by a tractor.

Open flame burner(s) or torch(es) 40 provides thermal power (BTUs) for the device 10. The amount of power required per effective treatment is a function of application conditions and objectives. The open flame burner(s) or torch(es) 40 used in device 10 can vary in size, number of orifices and orifice capacity, shape (e.g., round, oval, square, rectangular), and number. Burner(s) or torch(es) 40 can be designed to produce unique flame characteristics (e.g., focal length, shape, footprint, BTU output). Burner(s) or torch(es) 40 are carefully located within basket 20 and selected specifically for the size and shape of the basket in which they will be used.

The metal fabric liner 50 can be a single liner or multiple liners. Liner 50 creates an enclosed space for secondary combustion of the flame exiting burner(s) or torch(es) 40. Liner 50 is securely attached to the metal framework of basket 20. The material forming metal fabric liner 50 is selected to be resistant to flames high heat, and corrosion. Liner 50 captures, contains, shapes, and directs the flames and flow of hot exhaust gases produced by the burner(s) or torch(es) 40. Metal fabric liner 50 is porous, allowing a free flow of air into the combustion chamber to help maximize efficient burning of the fuel. Liner 50 is placed in specific relationship to burner(s) or torch(es) 40 to allow air flow into the top of the basket 20 in support of primary combustion while still capturing, containing, and directing the flames and hot gases that are exiting the burner 40. Liner 50 extends to portions of the bottom of basket 20 to guide the flames and hot gases to the ground and to control where they may exit the basket 20. The location and size of liner 50 provides an opening for the flames and hot gases to exit the basket 20 as they bounce off the round, forward and away from the basket 20 due to the force and angle at which they strike the ground.

Flame reflector 60 is comprised of one or more sheets of thin metal sheeting and functions to help capture, contain, and direct the flames and hot gases as they flow through the lined basket 20 and exit the bottom. Flame reflector 60 is flame, heat, and corrosion resistant, is lightweight, and is attached to the frame of basket 20 and may also be jointly connected to metal fabric liner 50. Flame reflector 60 can be placed at one or more locations within basket 20 to facilitate control and shaping of the exiting flames and hot gases, depending upon device 10's specific function and intended vegetation control "footprint" or "impact zone". For example, a device 10 intended for use in a vineyard will have a relatively large basket 20 and may include several metal fabric liners 50 and several flame reflectors 60 carefully placed to not only capture, contain, focus, shape, and direct the flow of flames and hot air produced by the burner(s) or torch(es) 40, but also to extend and widen the treatment area to the extent necessary to achieve effective treatment within typical vineyard cropping systems.

An important option in the present invention is the use of water supplied via water line 92. Fire and smoke are the principal hazards commonly associated with the use of open flame burners and torches currently used. The simultaneous use of water when using the present invention will help prevent the occurrence of fire and smoke whenever combustible materials are present and temperatures are high and the landscape dry. Very small amounts of water can be highly effective for this purpose.

It will be obvious to those having skill in the art that many changes may be made to the details of the above-described embodiments of this invention without departing from the underlying principles thereof. The scope of the present invention should, therefore, be determined only by the following claims.

The invention claimed is:

1. An open flame control device for weed control comprising:
   an open framework flame containment structure having a front side, a back side, an upper end, and an open lower end;
   at least one flame producing burner located within said flame containment structure adjacent said upper end thereof and configured to direct a flame and hot gases generated thereby towards and out of said open lower end of said flame containment structure;
   a porous metal fabric liner surrounding the inside of said flame containment structure and attached thereto, said porous metal fabric liner extending from an area adjacent the bottom of said at least one flame producing burner to an area adjacent to the bottom of said flame containment structure, said porous metal fabric liner configured to capture and contain said flame and hot gases generated by said at least one flame producing burner and direct them out of said open lower end of said flame containment structure;
   at least one metal flame reflector located adjacent said lower end of said flame containment structure and occupying a portion of said back side thereof; and
   means allowing a user to move said device into killing proximity to weeds.

2. The open flame control device of claim 1 wherein said flame containment structure is substantially tubular in shape.

3. The open flame control device of claim 1 wherein said flame containment structure is substantially cylindrical in shape.

4. The open flame control device of claim 1 wherein said flame containment structure is a substantially cylindrical basket having an open framework including a plurality of longitudinal struts attached to a plurality of hoops.

5. The open flame control device of claim 4 wherein said struts are bent inwardly and upwardly at their upper ends and received within and attached to a hub.

6. The open flame control device of claim 5 wherein there is one flame producing burner which is attached to said hub.

7. The open flame control device of claim 1 including means for communicating said at least one burner with a supply of propane.

8. The open flame control device of claim 1 wherein said front side is longer than said back side to produce an angular lower end.

9. An open flame control device for weed control comprising:
   an open framework flame containment structure having a front side, a back side, an upper end, and an open lower end;
   said flame containment structure being formed of a substantially cylindrical basket including a plurality of substantially equally spaced-apart longitudinal struts attached to a plurality of hoops, said struts being inwardly and upwardly bent at the upper end of said basket;
   a hub located at the upper end of said basket, said hub receiving and attached to said inwardly and upwardly bent struts;
   an open flame burner located within said basket adjacent said upper end thereof and attached to said hub;
   a porous metal fabric liner surrounding the inside of said basket and attached thereto, said porous metal fabric liner extending from an area adjacent the bottom of said burner to an area adjacent to the bottom of said basket, said porous metal fabric liner configured to capture and contain said flame and hot gases generated by said flame producing burner and direct them out of said open lower end of said basket;
   a metal flame reflector located adjacent said lower end of said basket and occupying at least a portion of the back side portion of said basket; and
   means for communicating said open flame burner with a supply of propane.

10. The device of claim 9 including means for supplying water to the lower end of said basket.

11. The device of claim 9 including means allowing a user to move said device into killing proximity to weeds.

12. The device of claim 9 wherein said metal flame reflector occupies about one-half of the back side portion of said basket.

13. The device of claim 9 wherein said front side of said basket is longer than said back side to produce an angular lower end.

14. The open flame control device of claim 1 including means for supplying water to the lower end of said flame containment structure.

\* \* \* \* \*